United States Patent
Du et al.

(10) Patent No.: US 10,645,391 B2
(45) Date of Patent: May 5, 2020

(54) GRAPHICAL INSTRUCTION DATA PROCESSING METHOD AND APPARATUS, AND SYSTEM

(71) Applicant: TENCENT TECHNOLOGY (SHENZHEN) COMPANY LIMITED, Shenzhen (CN)

(72) Inventors: Xingge Du, Shenzhen (CN); Zhiming Nie, Shenzhen (CN); Congbing Li, Shenzhen (CN); Feng Ai, Shenzhen (CN); Yu Gu, Shenzhen (CN); Yangjun Wang, Shenzhen (CN); Wensheng Cao, Shenzhen (CN); Jinfeng Ye, Shenzhen (CN); Weiguang Wang, Shenzhen (CN); Xiang Han, Shenzhen (CN); Dongzhe Cheng, Shenzhen (CN); Guole Chen, Shenzhen (CN); Henan Zhou, Shenzhen (CN); Zhiwei Zhuang, Shenzhen (CN); Chao Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 128 days.

(21) Appl. No.: 15/926,547

(22) Filed: Mar. 20, 2018

(65) Prior Publication Data

US 2018/0213232 A1 Jul. 26, 2018

Related U.S. Application Data

(63) Continuation of application No. PCT/CN2017/072538, filed on Jan. 25, 2017.

(30) Foreign Application Priority Data

Jan. 29, 2016 (CN) .......................... 2016 1 0067797

(51) Int. Cl.
*H04N 19/137* (2014.01)
*G06T 9/00* (2006.01)
(Continued)

(52) U.S. Cl.
CPC ............. *H04N 19/137* (2014.11); *G06F 9/54* (2013.01); *G06T 9/00* (2013.01); *H04N 19/126* (2014.11); *H04L 5/0064* (2013.01)

(58) Field of Classification Search
CPC .......... G06F 9/54; G06T 9/00; H04L 5/0064; H04N 19/126; H04N 19/137
See application file for complete search history.

(56) References Cited

U.S. PATENT DOCUMENTS

| 5,828,370 A | * | 10/1998 | Moeller | ............... | H04N 5/4401 |
| | | | | | 715/720 |
| 6,108,728 A | * | 8/2000 | Kobayashi | ........... | H04N 21/218 |
| | | | | | 348/E5.008 |

(Continued)

FOREIGN PATENT DOCUMENTS

| CN | 101031085 | 9/2007 |
| CN | 101322413 | 12/2008 |

(Continued)

OTHER PUBLICATIONS

International Search Report dated May 4, 2017 in PCT/CN2017/072538 filed Jan. 25, 2017.

(Continued)

*Primary Examiner* — Peter D Le
(74) *Attorney, Agent, or Firm* — Oblon, McClelland, Maier & Neustadt, L.L.P.

(57) ABSTRACT

A graphical instruction data processing method and apparatus, and a system are disclosed, to help reduce a quantity of transmitted graphical instruction data, and lower a requirement on bandwidth. Aspects of the disclosure provide a method for processing graphical instruction data. The method includes obtaining, by a server device in a cloud interactive system, graphical instruction data of a frame, and determining whether the frame satisfies a key frame setting condition. Further, the method includes when the frame is (Continued)

determined to fail to satisfy the key frame setting condition, comparing the graphical instruction data of the frame with graphical instruction data of a current key frame, to obtain differential data, and sending the differential data to user equipment in the cloud interactive system. The user equipment reconstructs the graphical instruction data of the frame according to the current key frame and the differential data.

16 Claims, 8 Drawing Sheets

(51) Int. Cl.
  *G06F 9/54* (2006.01)
  *H04N 19/126* (2014.01)
  *H04L 5/00* (2006.01)

(56) References Cited

U.S. PATENT DOCUMENTS

| | | | | |
|---|---|---|---|---|
| 8,321,905 | B1* | 11/2012 | Streeter | H04N 21/44004 709/231 |
| 8,619,198 | B1* | 12/2013 | Andreev | G11B 27/28 348/701 |
| 8,692,837 | B1* | 4/2014 | Sreenivas | G09G 5/36 345/536 |
| 8,908,775 | B1* | 12/2014 | Higa | H04N 19/90 375/240.26 |
| 9,049,271 | B1* | 6/2015 | Hobbs | H04L 47/25 |
| 9,436,876 | B1* | 9/2016 | Carlson | G06K 9/6224 |
| 9,467,532 | B2* | 10/2016 | Ro | H04L 67/42 |
| 2002/0101442 | A1* | 8/2002 | Costanzo | H04L 29/06027 715/723 |
| 2002/0104094 | A1* | 8/2002 | Alexander | G08B 13/19602 725/105 |
| 2004/0151390 | A1* | 8/2004 | Iwamura | G06F 3/1462 382/236 |
| 2004/0156549 | A1* | 8/2004 | Persiantsev | H04N 19/63 382/236 |
| 2005/0104889 | A1* | 5/2005 | Clemie | G06T 9/00 345/522 |
| 2005/0141861 | A1* | 6/2005 | Dunbar | H04N 5/783 386/344 |
| 2009/0100483 | A1* | 4/2009 | McDowell | G06F 9/451 725/109 |
| 2009/0323801 | A1* | 12/2009 | Imajou | H04N 21/431 375/240.01 |
| 2010/0057928 | A1* | 3/2010 | Kapoor | G06F 16/4387 709/231 |
| 2011/0157196 | A1* | 6/2011 | Nave | G06T 15/005 345/522 |
| 2013/0128988 | A1* | 5/2013 | Rajagopalan | H04N 19/61 375/240.25 |
| 2013/0195421 | A1* | 8/2013 | Chen | G11B 27/034 386/239 |
| 2014/0028692 | A1* | 1/2014 | Kim | G09G 5/003 345/545 |
| 2014/0289369 | A1* | 9/2014 | Yang | H04N 19/56 709/219 |
| 2015/0092856 | A1* | 4/2015 | Mammou | H04N 19/597 375/240.16 |
| 2015/0172775 | A1* | 6/2015 | Yee | H04N 21/485 725/37 |
| 2015/0334403 | A1* | 11/2015 | Smithers | G06T 9/00 345/555 |
| 2016/0247537 | A1* | 8/2016 | Ricciardi | G06F 16/71 |
| 2017/0142452 | A1* | 5/2017 | Bae | H04N 19/507 |
| 2017/0150145 | A1* | 5/2017 | Kennedy | H04N 19/115 |

FOREIGN PATENT DOCUMENTS

| | | |
|---|---|---|
| CN | 102566910 | 7/2012 |
| CN | 103440612 | 12/2013 |
| CN | 103688240 | 3/2014 |
| CN | 104375592 | 2/2015 |
| CN | 105760238 | 7/2016 |

OTHER PUBLICATIONS

Office Action dated May 4, 2017 in Chinese Patent Application No. 201610067797.6 (With Concise English Translation).
Office Action dated Sep. 26, 2017 in Chinese Patent Application No. 201610067797.6 (With Concise English Translation).

* cited by examiner

GRAPHICAL INSTRUCTION DATA PROCESSING METHOD AND APPARATUS, AND SYSTEM

RELATED APPLICATION

This application is a continuation of International Application No. PCT/CN2017/072538, filed on Jan. 25, 2017, which claims priority to Chinese Patent Application No. 201610067797.6, filed with the Chinese Patent Office on Jan. 29, 2016, and entitled "GRAPHICAL INSTRUCTION DATA PROCESSING METHOD AND APPARATUS, AND SYSTEM". The entire disclosures of the prior applications are hereby incorporated by reference in their entirety.

FIELD OF THE TECHNOLOGY

The present disclosure relates to the field of cloud technologies, and specifically to a graphical instruction data processing method and apparatus, and a system.

BACKGROUND OF THE DISCLOSURE

As terminal technologies and network bandwidth develop rapidly and cloud computing technologies are increasingly mature in recent years, a cloud interactive system emerges. An existing cloud interactive system generally includes a server and multiple user equipment. The server may be a cluster server. Multiple interactive applications may all be run in the cloud interactive system.

During running of an interactive application such as a cloud game, the server may need to exchange a graphical interface with the user equipment. Graphical instruction data of the graphical interface is transmitted in frames.

During actual interaction, a quantity of transmitted graphical instruction data is relatively large, and a requirement on bandwidth in network transmission is very high. Consequently, it is easy to cause a phenomenon such as an intermittent stop of an interface or unsmooth playback on a user equipment end.

SUMMARY

Embodiments of the present disclosure provide a graphical instruction data processing method and apparatus, and a system, to help reduce a quantity of transmitted graphical instruction data, and lower a requirement on bandwidth.

Aspects of the disclosure provide a method for processing graphical instruction data. The method includes obtaining, by processing circuitry of a server device in a cloud interactive system, graphical instruction data of a frame, and determining whether the frame satisfies a key frame setting condition. Further, the method includes when the frame is determined to fail to satisfy the key frame setting condition, comparing the graphical instruction data of the frame with graphical instruction data of a current key frame, to obtain differential data, and sending the differential data to user equipment in the cloud interactive system. The user equipment reconstructs the graphical instruction data of the frame according to the current key frame and the differential data.

In some embodiments, after determining whether the frame satisfies the key frame setting condition, the method includes when the frame is determined to satisfy the key frame setting condition, recording the frame as a new current key frame and sending the graphical instruction data of the frame to the user equipment.

To determine whether the frame satisfies the key frame setting condition, in an example, the method includes calculating a difference between the frame and the current key frame, and determining, according to whether the difference is out of a threshold range, whether the frame satisfies the key frame setting condition.

In an example, the method includes, after obtaining the differential data, compressing the differential data, and sending the compressed differential data to the user equipment.

According to an aspect of the disclosure, the method includes capturing a drawing operation of a graphical interface for a frame, generating graphical instruction data based on the drawing operation, placing the graphical instruction data into a processing queue and obtaining the graphical instruction data of the frame from the processing queue.

To compare the graphical instruction data of the frame with the graphical instruction data of the current key frame to obtain the differential data, in an example, the method includes determining an optimal matching length and an offset location of the frame to the current key frame and including the optimal matching length and the offset location in the differential data.

Aspects of the disclosure provide a method for graphical instruction data processing. The method includes receiving, by user equipment in a cloud interactive system, data of a frame that is sent by a server in the cloud interactive system, and identifying whether the frame is a key frame. When the frame is not the key frame, the method includes obtaining a current key frame, determining that the data of the frame is differential data between the frame and the current key frame, and obtaining graphical instruction data of the frame according to the data of the frame and the current key frame.

In some embodiments, after identifying whether the frame is the key frame, the method includes when the frame is the key frame, determining that the data of the frame is the graphical instruction data of the frame and recording the frame as a current key frame.

In an example, the method includes playing back the graphical instruction data of the frame, to generate a graphical interface of the frame.

According to an aspect of the disclosure, the data of the frame is compressed data, and the method further includes after receiving the compressed data of the frame that is sent by the server, decompressing the compressed data.

In some embodiments, the method includes receiving an optimal matching length and an offset location in the differential data, and recovering the graphical instruction data of the frame according to the current key frame, the optical matching length and the offset location.

To identify whether the frame is the key frame, in an example, the method includes detecting whether the data of the frame includes a specific flag that is used to indicate the key frame.

Aspects of the disclosure provide an apparatus that includes interface circuitry and processing circuitry. The interface circuitry is configured to receive data of a frame that is sent by a server device in a cloud interactive system with the apparatus. The processing circuitry is configured to identify whether the frame is a key frame. When the frame is not a key frame, the processing circuitry is configured to obtain a current key frame, determine that the data of the frame is differential data between the frame and the current key frame and obtain graphical instruction data of the frame according to the data of the frame and the current key frame.

Aspects of the disclosure provide an apparatus that includes interface circuitry and processing circuitry. The processing circuitry is configured to obtain graphical instruction data of a frame, and determine whether the frame satisfies a key frame setting condition. Further, when the frame fails to satisfy the key frame setting condition, the processing circuitry is configured to compare the graphical instruction data of the frame with graphical instruction data of a current key frame, to obtain differential data. The interface circuitry is configured to send the differential data to user equipment in a cloud interactive system with the apparatus. The user equipment reconstructs the graphical instruction data of the frame according to the current key frame and the differential data.

As can be learned from the above, in some feasible implementations of the present disclosure, differential data between graphical instruction data of a frame and graphical instruction data of a current key frame is obtained, and the differential data is used as to-be-sent data of the frame. Because a size of the differential data is far less than that of original graphical instruction data, a quantity of transmitted data can be effectively reduced, and a requirement on bandwidth can be lowered, thereby helping implement efficient and smooth communication, and ensuring smoothness of graphical interfaces.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure shall fall within the protection scope of the present disclosure.

Figure 3:
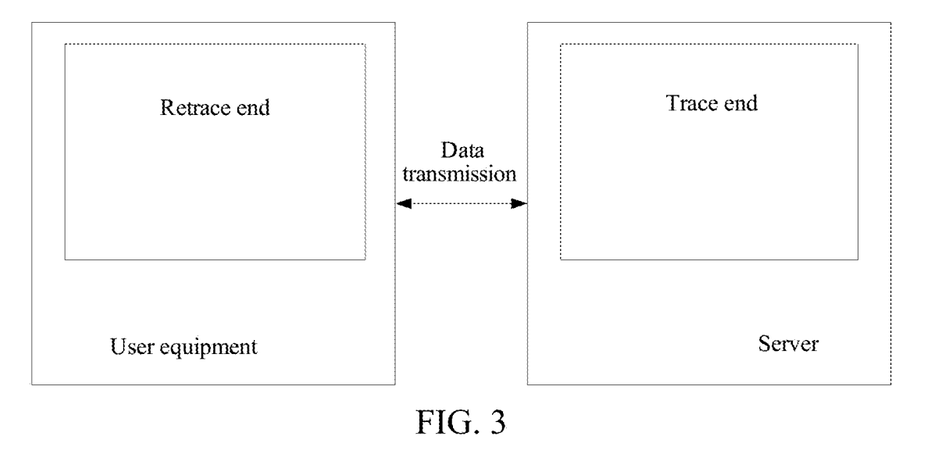
FIG. 3 is a schematic architectural diagram of a cloud interactive system.

FIG. 3 is a schematic architectural diagram of a cloud interactive system. The cloud interactive system includes a server and user equipment, and is configured to run an interactive application such as a cloud game. The server and a client of the user equipment on which the interactive application are separately run are generally referred to as a trace end and a retrace end. The cloud game means that: an actual client of the game runs on a cloud server, and an interface of the game is displayed on a machine of a player; and local keyboard and mouse control of the player are remotely redirected to the cloud server to implement control on the game. Using the cloud game as an example, the trace end is a game client running on a cloud game server, that is, a cloud end of the cloud game, and implements main logic running of the game, and transmits, to the retrace end by using a network, a related graphical interface exchanged with a user. The retrace end is a client running on the user equipment, that is, a user end of the cloud game, and is configured to: present a graphical interface of the game on the trace end, and transmit, to the trace end by using the network, an input of a device such as a mouse or a keyboard of the user. During running of the interactive application such as the cloud game, the server may need to exchange a graphical interface with the user equipment.

Figure 1:
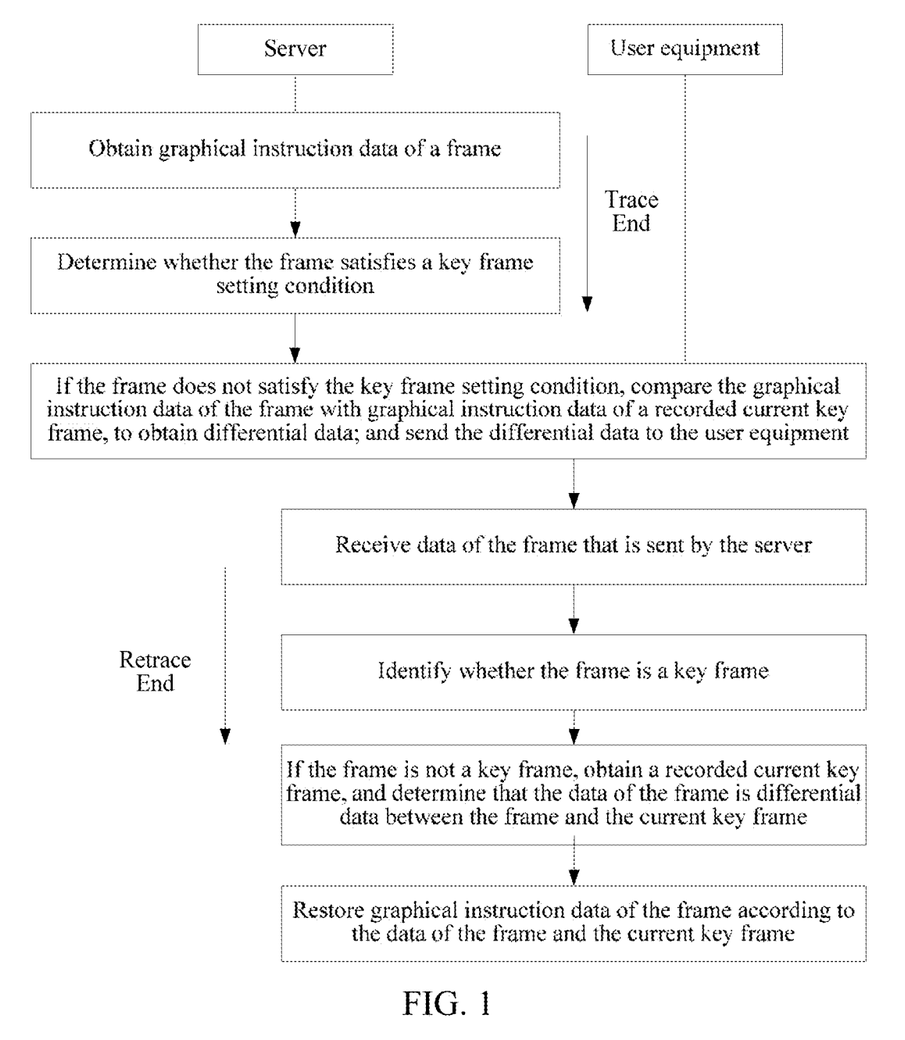
FIG. 1 is a flowchart of interaction between a trace end and a retrace end.

Referring to FIG. 1, FIG. 1 is a flowchart of interaction between a trace end and a retrace end. As shown in FIG. 1, a cloud game is run on the trace end. The trace end may capture each graphical interface drawing operation, record a rendering instruction, to generate graphical instruction data, and send the graphical instruction data to the retrace end by using a network. The retrace end receives the instruction data and parses and plays back the rendering instruction, invokes a related graphical drawing application programming interface (API) to draw an image, and plays an interface of the cloud game. The graphical instruction data is transmitted in frames.

Figure 2:
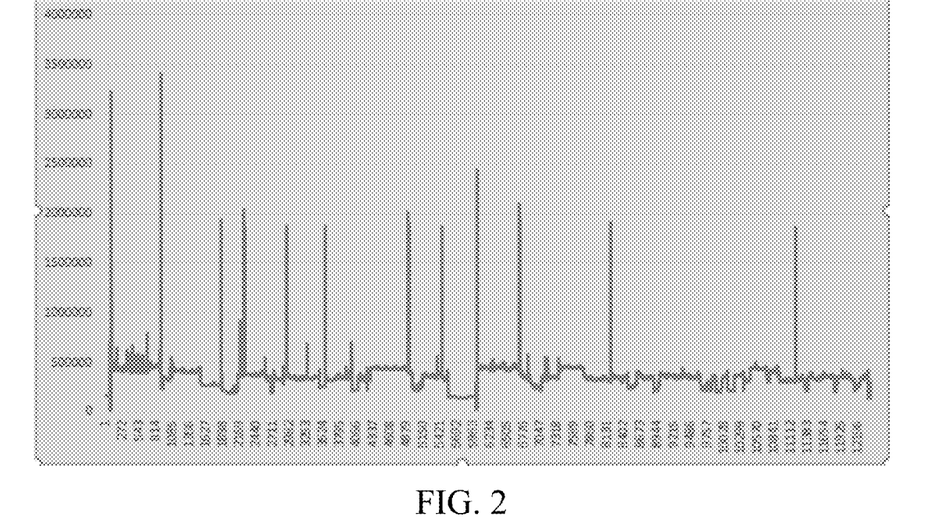
FIG. 2 is a schematic diagram of distribution of a quantity of instruction data of each frame of a game.

During running of the game, frequency that a graphical rendering API is invoked for an interface of each frame is extremely high, and there are a lot of parameters of a rendering instruction. During recording, these instructions and parameters need to be recorded, and all texture data, vertex data, index data and the like further need to be recorded. In a diagram of distribution of a quantity of instruction data of each frame of a game shown in FIG. 2, as can be learned, an average value of quantities of data of the frames exceeds 500 K bytes, and a peak value of the quantities of data reaches 3400 K bytes. The smooth game is rendered at a speed of 60 frames per second, and a speed of transmitting traffic by the game to the network reaches an average value being 30 MB/s, and a peak value reaches above 200 MB/s.

During running of the cloud game, the trace end on a server needs to send graphical instruction data of a graphical interface of each frame to the retrace end on user equipment, so that the retrace end generates and plays a graphical interface of the cloud game according to the received graphical instruction data. As can be learned, a quantity of transmitted graphical instruction data is relatively large, and a requirement on bandwidth in network transmission is very high. Consequently, it is easy to cause a phenomenon such as an intermittent stop of an interface or unsmooth playback on the retrace end. To reduce the quantity of transmitted graphical instruction data, and lower the requirement on bandwidth, embodiments of the present disclosure provide a graphical instruction data processing method and apparatus, and a system.

Detailed descriptions are separately provided below by using specific embodiments.

Embodiment 1

Figure 4:
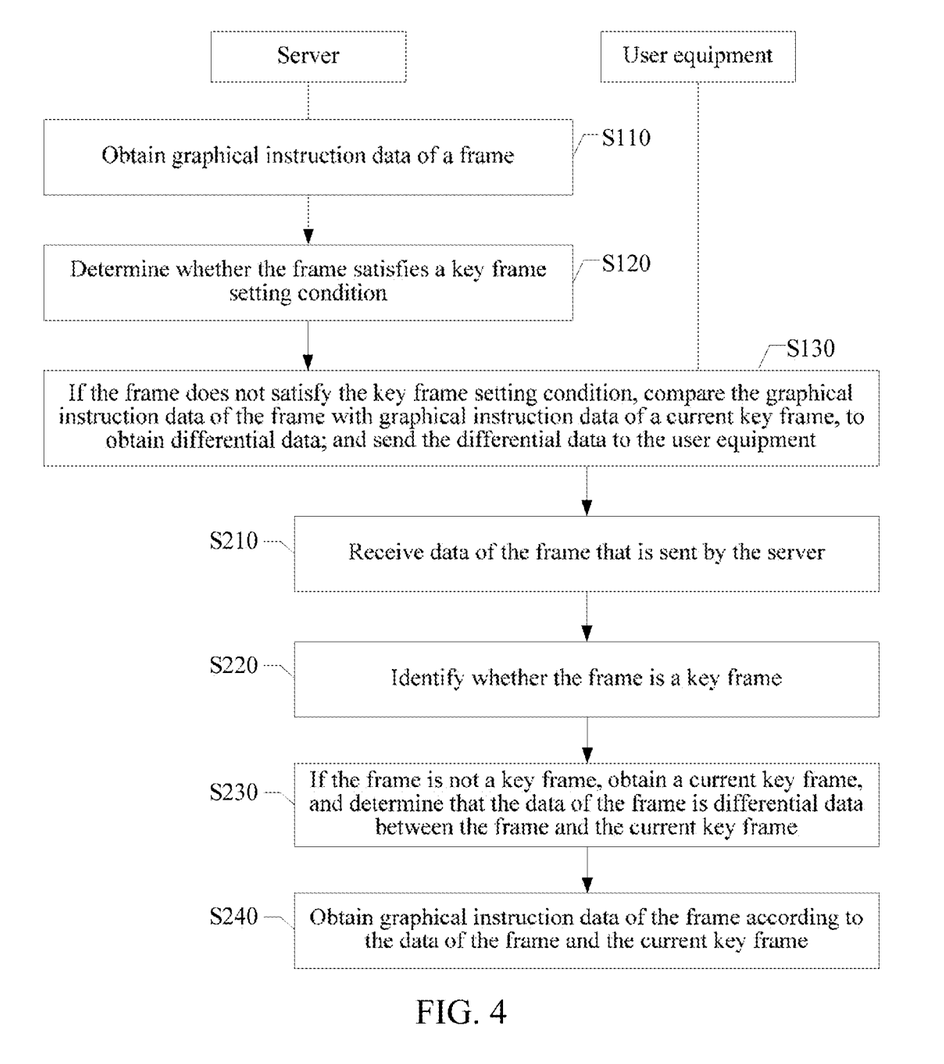
FIG. 4 is a schematic flowchart of a graphical instruction data processing method according to an embodiment of the present disclosure.

Referring to FIG. 4, this embodiment of the present disclosure provides a graphical instruction data processing method, applied to a cloud interactive system shown in FIG. 3. The cloud interactive system includes a server and user equipment. The cloud interactive system is configured to run an interactive application such as a cloud game. In this specification, the cloud game is used as an example for description. The cloud interactive system may be understood as a cloud game system.

On a server side, the method may include the following steps:

S110: The server obtains graphical instruction data of a frame.

During running of the cloud game, usually, the server is responsible for image drawing, and after completing drawing, sends a drawn image frame to the user equipment. After receiving the drawn image frame, the user equipment decodes the image frame, and then displays an interface of an image. The trace end may capture a drawing operation of a graphical interface of each frame, and record a graphical drawing and rendering instruction, to generate graphical instruction data, and place the graphical instruction data into a processing queue. When data of a frame needs to be sent, graphical instruction data of the frame can be obtained from the processing queue.

S120: Determine whether the frame satisfies a key frame setting condition.

In this embodiment of the present disclosure, a key frame policy is pre-created, and it is determined, according to the key frame policy, whether the frame satisfies the key frame setting condition, to determine whether to update a current key frame. Optionally, if the frame is a first frame, the frame may be directly recorded as the current key frame. If the frame is not a first frame, a difference between the frame and a recorded current key frame may be calculated, and it is determined, according to whether the difference is beyond a threshold range, whether the frame satisfies the key frame setting condition.

The difference may be a ratio of a size of the graphical instruction data of the frame to a size of graphical instruction data of the recorded current key frame. Specifically, when the difference is beyond the threshold range, it is considered that the difference between the two frames is relatively large, and it is determined that the frame satisfies the key frame setting condition. When the difference is within the threshold range, it is considered that the difference between the two frames is relatively small, and it is determined that the frame does not satisfy the key frame setting condition. For example, the threshold range may be set to (0.3, 2.0).

S130: If the frame does not satisfy the key frame setting condition, compare the graphical instruction data of the frame and graphical instruction data of a current key frame, to obtain differential data; and send the differential data to the user equipment.

When a determining result in S120 is that the frame does not satisfy the key frame setting condition, the current key frame is not updated, the differential data between the frame and the recorded current key frame is obtained by using the recorded current key frame, and the differential data is sent to the user equipment without a need of sending all data of the frame.

In an implementation, the differential data may be further compressed, and the compressed differential data is sent to the user equipment.

Further, the method may further include:

if a determining result in S120 is that the frame satisfies the key frame setting condition, performing a key frame update, recording the frame as a current key frame, and sending the graphical instruction data of the frame to the user equipment, so that the user equipment generates the a graphical interface of the frame.

When the determining result in S120 is that the frame satisfies the key frame setting condition, it indicates that the difference between the two frames is relatively large. If an originally recorded current key frame is still used, obtained differential data is also relatively large. Consequently, an effect of reducing transmitted traffic cannot be well achieved. Therefore, the key frame update needs to be performed, and the frame is used to replace the recorded current key frame. In addition, for the frame, the differential data is not calculated; instead, the graphical instruction data of the frame is directly sent to the user equipment. Optionally, the graphical instruction data of the frame may be compressed and then sent to the user equipment. Optionally, the server may insert a special identifier to the data of the frame. The special identifier is used to indicate that the frame is a key frame, to facilitate identification by the user equipment.

When the data is compressed, a DEFLATE compression algorithm of zlib may be used. Certainly, another compression algorithm may be used, and this is not limited in this specification.

On a user equipment side, the method may include the following steps:

S210: The user equipment receives data of a frame that is sent by the server.

The server sends data to the user equipment in frames, and the user equipment receives the data in frames. If the received data is compressed data, the user equipment decompresses the compressed data of the frame that is received.

S220: Identify whether the frame is a key frame.

The user equipment first needs to identify the data of the frame, to determine whether the frame is a key frame. In some embodiments, a special identifier in the data of the frame may be identified, to determine whether the frame is a key frame.

S230: If the frame is not a key frame, obtain a recorded current key frame, and determine that the data of the frame is differential data between the frame and the current key frame. Optionally, if an identification result in S220 is that the frame is a key frame, it is determined that the data of the frame is graphical instruction data of the frame; and a key frame update is performed, and the frame is recorded as a current key frame.

The data of the frame that is received by the user equipment may be original graphical instruction data, or may be differential data between original graphical instruction data and the recorded current key frame. When the frame is a key frame, the data of the frame that is received by the user equipment is the original graphical instruction data, and the user equipment needs to perform the key frame update, and update a locally recorded current key frame to the frame. When the frame is not a key frame, the differential data is received.

S240: Obtain graphical instruction data of the frame according to the data of the frame and the current key frame.

If the differential data is received, the user equipment may obtain the original graphical instruction data of the frame by using the current key frame and the differential data.

After the graphical instruction data of the frame is obtained, further, the method may further include: playing back the graphical instruction data of the frame, to generate a graphical interface of the frame.

As can be learned from the above, in some feasible implementations of the present disclosure, during running of a cloud game, differential data between graphical instruction data of a frame and graphical instruction data of a current key frame may be obtained, and the differential data may be used as to-be-sent data of the frame. Because a size of the differential data is far less than that of original graphical instruction data, a quantity of transmitted data of a frame can be effectively reduced, and a requirement on bandwidth can be lowered, thereby helping implement efficient and smooth communication between a trace end and a retrace end, and ensuring smoothness of interfaces of images.

For ease of better understanding the technical solutions provided in the embodiments of the present disclosure, descriptions are provided by using an implementation in a specific scenario as an example below.

Figure 5:
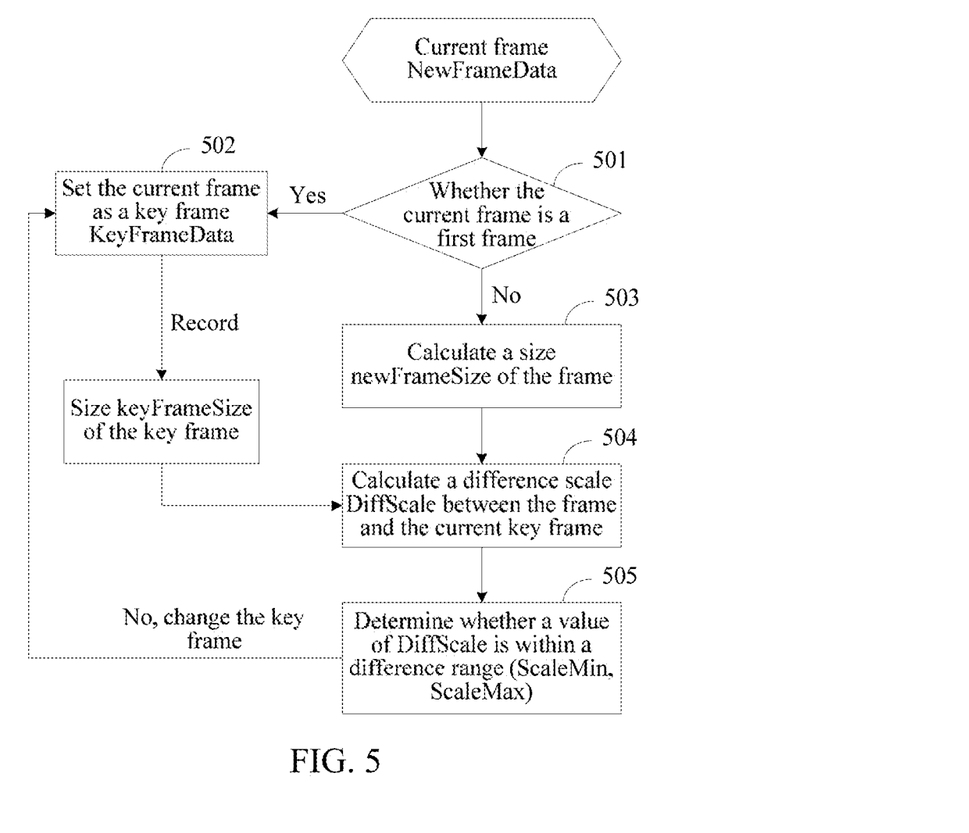
FIG. 5 is a schematic flowchart of creating a key frame policy by a trace end.
Figure 6:
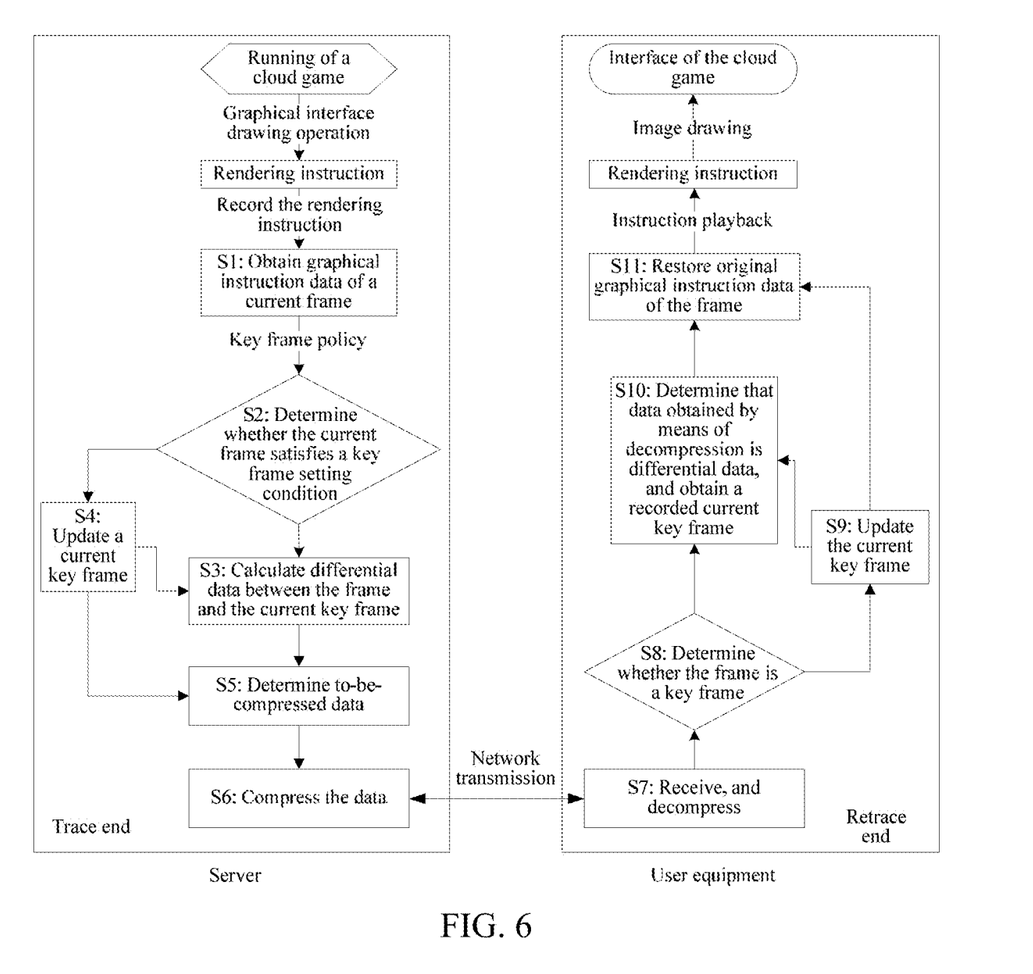
FIG. 6 is a schematic flowchart of processing graphical instruction data by a trace end and a retrace end.

Referring to FIG. 5 and FIG. 6, FIG. 5 and FIG. 6 show a graphical instruction data processing method according to an embodiment of the present disclosure, including a compression procedure and a decompression procedure, which are respectively applied to a trace end on a server side and a retrace end on a user equipment side, and may specifically include:

1. A key frame policy is pre-created.

In this step, the key frame policy is created, to determine a key frame. When a server sends data of an image frame of a cloud game to user equipment, it is important to determine to set which frame as a key frame. Because for data of each of subsequent frames, differential data is obtained according to data of the key frame, and obtained differential data is expected to be as small as possible, the key frame needs to be more typical. The key frame policy is used to find a most typical frame as the key frame.

Referring to FIG. 5, a specific process in which the trace end creates the key frame policy may include:

S501: Determine whether a frame NewFrameData is a first frame (or referred to as a start frame).

S502: If the frame is the first frame, a key frame setting condition is satisfied, the frame may be directly set as a current key frame, and the frame may be recorded as KeyFrameData. Further, a special identifier may be added to data of the frame for identification, and a size keyFrameSize of the current key frame KeyFrameData may be recorded.

S503: If the frame is not the first frame, calculate a size newFrameSize of original graphical instruction data NewFrameData of the frame.

S504: Calculate a ratio of newFrameSize to a size keyFrameSize of the graphical instruction data of the current key frame, and record the ratio as a difference scale DiffScale, where the ratio indicates a difference between the two frames.

S505: Set a difference range (ScaleMin, ScaleMax); determine whether a value of the difference scale DiffScale is within the range; and if the value of the difference scale DiffScale is within the range, it is considered that the frame does not satisfy the key frame setting condition, and a key frame update does not need to be performed; or if a value of the difference scale DiffScale is not within the range, it is considered that the frame satisfies the key frame setting condition, and a key frame update needs to be performed. Therefore, the frame NewFrameData may be recorded as a new current key frame, to replace an original current key frame. Optionally, a relatively good effect can be obtained by setting the difference range (ScaleMin, ScaleMax) to (0.3, 2.0).

2. A compression procedure of graphical instruction data.

As shown in FIG. 6, a specific procedure of a graphical instruction data processing method on the trace end may include:

S1: Obtain graphical instruction data of a frame.

During running of the cloud game, the trace end captures a graphical interface drawing operation of each frame, and records a graphical drawing and rendering instruction, to generate graphical instruction data of the frame.

S2: Determine, according to the foregoing key frame policy, whether the frame satisfies a key frame setting condition; and if the frame does not satisfy the key frame setting condition, it indicates that a key frame update does not need to be performed, and perform step S3; or if the frame satisfies the key frame setting condition, it indicates that a key frame needs to be updated by using the frame, and perform step S4.

S3: Calculate differential data between the frame and a current key frame.

The graphical instruction data of the frame is compared with graphical instruction data of the current key frame, to find the differential data, and record the differential data. Because differences between data of neighboring several frames are generally relatively small, the differential data is much smaller than original graphical instruction data, so that a quantity of data transmitted by using a network can be greatly reduced.

A difference or an exclusive OR value between data blocks of the frames can be easily obtained by calculating the differential data between the data of the frame and the current key frame. However, graphical instruction data of each frame is changing, and a same piece of graphical instruction data is often offset forward or backward in data blocks of frames. Therefore, to obtain a better effect, in some embodiments of the present disclosure, a data difference comparison algorithm is provided, so that instruction data that is offset forward or backward in the data of the frame can be found.

A procedure of calculating differential data between frames by using the data difference comparison algorithm may include:

a: Consider graphical instruction data of the current key frame (current key frame data for short) as a character array KeyFrameData[m] of a length of m, and consider the graphical instruction data of the frame (frame data for short) as a character string array NewFrameData[n] of a length of n.

b: For NewFrameData[n], set k to a value ranging from 0 to n−1; for each value of k, extract a segment of data from NewFrameData[k] to NewFrameData[n−1]; traverse KeyFrameData[m] to find this segment of data, where inevitably, first t characters are exactly the same, that is, a segment of data from NewFrameData[k] to NewFrameData[k+t] can be found in KeyFrameData[m]; and find a largest t as an optimal matching length, and record a location of the optimal matching length in KeyFrameData.

c: Set a threshold T for a same length, find the optimal matching length when t is greater than the threshold T, and record all data of the optimal matching length and offset locations, as the differential data of the key frame, where data whose length is less than the threshold T may be directly copied to the end of the differential data.

In this way, the differential data between the frame and the current key frame is obtained by means of calculation.

It is noted that, on a receive end, original key frame data NewFrameData can be restored according to data of the optimal matching length in the differential data and an offset location of the data in KeyFrameData.

S4: Update the current key frame.

When the frame satisfies the key frame setting condition, in this step, the current key frame is updated by using the frame, and the recorded current key frame is replaced by the frame, that is, the frame is recorded as a new current key frame. Further, the trace end may add a special signal (Flag) identifier to the data of the key frame, to indicate that the frame is the key frame.

S5: Determine to-be-compressed data.

When the frame is not a key frame, it is determined that the differential data obtained by means of calculation is the to-be-compressed data.

When the frame is recorded as the new current key frame, it is determined that the frame is the to-be-compressed data.

S6: Compress the to-be-compressed data and send the data.

In this step, the differential data between the frame and the current key frame or the frame itself is compressed, the compressed data that is obtained is used as to-be-sent data of the frame, and the compressed data is sent to the retrace end. In some embodiments, the to-be-compressed data may be compressed by using the DEFLATE compression algorithm of zlib or another algorithm, so as to reduce, to the greatest extent, a quantity of data that needs to be transmitted.

3. A decompression procedure of the graphical instruction data.

Still referring to FIG. 6, a specific process of a graphical instruction data processing method on the retrace end may include:

S7: Receive the compressed data of the frame that is sent by the trace end, and decompress the compressed data.

S8: Determine whether data obtained by decompression is data of the key frame or is the differential data between the frame and the current key frame. In the key frame policy on the trace end, it is determined which frame is used as the key frame. The data obtained by means of decompression is parsed, to find whether the data includes the special flag identifier, and it is identified, by determining the identifier, whether the frame is the key frame.

S9: If it is determined that the frame is a key frame, record or perform a key frame update; and if the current key frame is already recorded, replace the current key frame, and record the frame as a new current key frame.

S10: If it is determined that the frame is not a key frame, the data obtained by means of decompression is differential data between the frame and the current key frame, and obtain the recorded current key frame.

S11: Obtain original data of the frame according to the differential data of the frame and the current key frame, where the original data is original graphical instruction data.

The instruction data is played back, to obtain a drawn graphical interface of the cloud game.

4. A processing queue of the graphical instruction data is created.

The cloud game has a relatively high requirement on real-time performance. Enough smoothness needs to be ensured in this process, to obtain better experience of the cloud game. For the graphical instruction data, a process of analyzing and compressing differential data between frames is relatively time-consuming. Therefore, the processing queue of the graphical instruction data may be created. After the original graphical instruction data is captured, the original graphical instruction data is first placed into the processing queue; and a difference waits to be analyzed for the original graphical instruction data, and the original graphical instruction data waits to be compressed and sent, to avoid a problem such as an intermittent stop of a graphical interface that affects an effect of the game.

A main thread of the trace end is configured to: capture a graphical interface drawing operation of each frame, record a graphical drawing and rendering instruction, to generate graphical instruction data of the frame, and place the graphical instruction data into the processing queue. Because the process of analyzing and compressing the differential data is time-consuming, when the process is performed by the main thread, smoothness of the game during recording of a graphical instruction is affected. In some embodiments, a data difference analysis and compression thread may be created, and data difference analysis, calculation, and compression are separately processed in the thread. Differential data analysis and compression are processed in an independent thread, so that a running speed of the main thread is not affected. The thread may directly transmit difference analysis and compression results to a background network sending thread for sending, or may place difference analysis and compression results into a to-be-sent queue, to wait for a background network sending thread to send the difference analysis and compression results, so as to obtain better smoothness.

As can be learned from the above, in the main thread, the graphical instruction data is obtained by recording an original rendering instruction and is placed in the processing queue of the graphical instruction data; in the difference analysis and compression thread, the graphical instruction data is extracted from the processing queue, to perform differential data analysis and apply a compression algorithm, and the results are directly sent or are placed into the to-be-sent queue, to wait for the background network sending thread to send the results.

Figure 7:
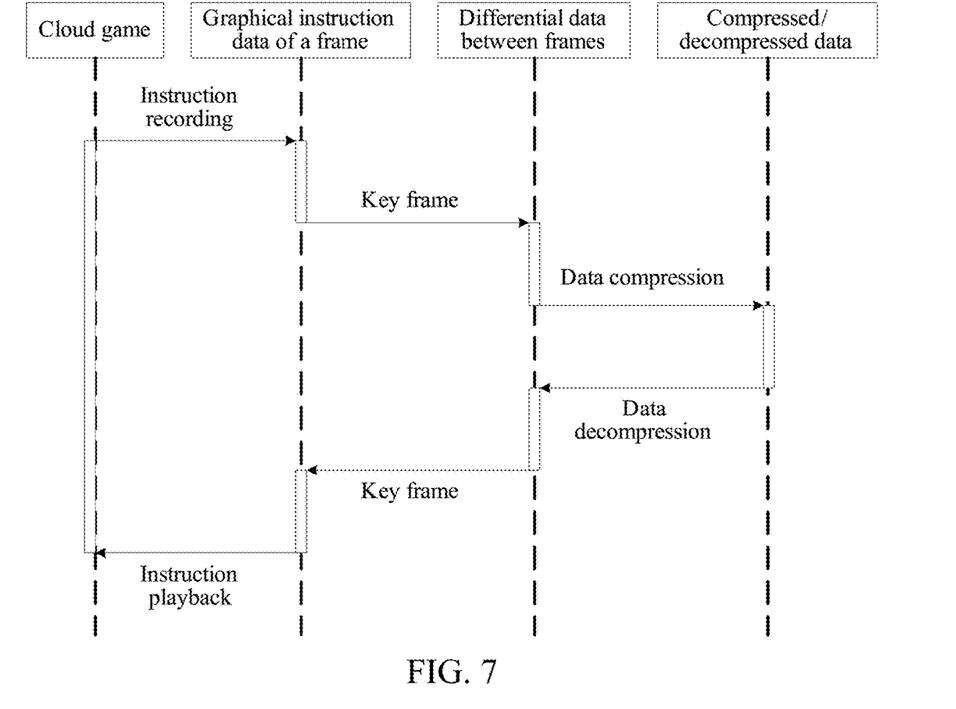
FIG. 7 is a schematic diagram of a time sequence of graphical instruction processing according to an embodiment of the present disclosure.

Referring to FIG. 7, FIG. 7 shows a time sequence of graphical instruction processing in a technical solution in an embodiment in Embodiment 1 of the present disclosure. After the technical solution in this embodiment of the present disclosure is applied, within a running period of a cloud game system, operations are sequentially performed for a cloud game, graphical instruction data of a frame, differential data between frames, and compressed/decompressed data.

As can be learned from the above, according to the graphical instruction data processing methods provided in the embodiments of the present disclosure, by means of a key frame policy, a size of data can be greatly reduced, traffic transmitted by using a network can be significantly reduced, a requirement on bandwidth can be lowered, a peak value of data traffic can be significantly lowered, and a time of receiving and sending data by the network can be shortened, so that the game is run more stably and better smoothness is obtained.

Figure 8:
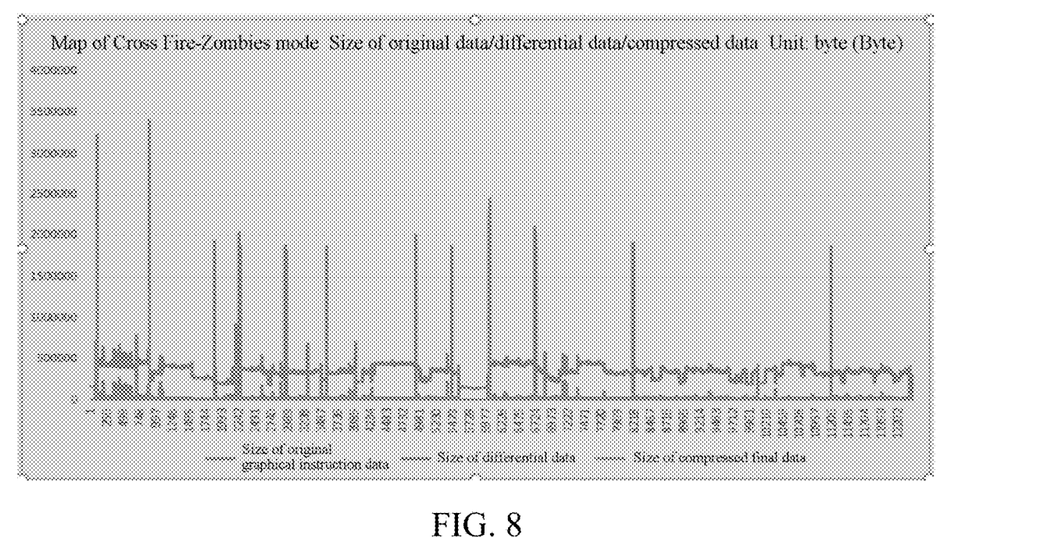
FIG. 8 is a schematic comparison diagram of distribution of a quantity of instruction data of each frame of a game.

As shown in FIG. 8, using a game as an example, distribution of a size of original graphical instruction data, a size of differential data, and a size of compressed data is compared. As can be learned, the differential data is greatly reduced when compared with the original graphical instruction data, and is further reduced after the data is compressed. An average size of data of frames after compression is approximately 12 k bytes, and is greatly reduced when compared with above 500 k bytes of the original data.

In addition to being applied to the cloud game, this embodiment of the present disclosure may be further applied to another application using a form in which graphical rendering is performed on a server end, and a rendering instruction is received on a client, for example, a scene roaming program that receives rendering data from the server end, or a virtual reality (VR) device that receives an interface from a cloud server.

To better implement the foregoing solutions in the embodiments of the present disclosure, the following further provides related apparatuses configured to cooperate to implement the foregoing solutions.

Figure 9:
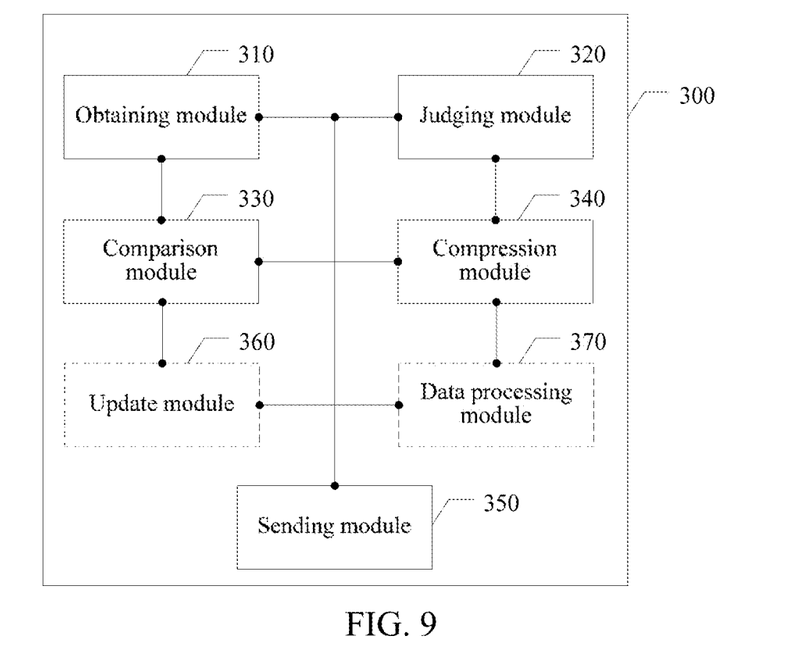
FIG. 9 is a schematic structural diagram of a graphical instruction data processing apparatus according to an embodiment of the present disclosure.

Referring to FIG. 9, an embodiment of the present disclosure provides a graphical instruction data processing apparatus 300, applied to a server of a cloud interactive system. The cloud interactive system includes the server and user equipment. The apparatus 300 may include:

an obtaining module 310, configured to obtain graphical instruction data of a frame;

a judging module 320, configured to determine whether the frame satisfies a key frame setting condition;

a comparison module 330, configured to: if the judging module determines that the frame does not satisfy the key frame setting condition, compare the graphical instruction data of the frame with graphical instruction data of a current key frame, to obtain differential data; and a sending module 350, configured to send the differential data to the user equipment, so that the user equipment obtains the graphical instruction data of the frame according to the current key frame and the differential data.

In some embodiments, the apparatus 300 further includes:

an update module 360, configured to: if the judging module determines that the frame satisfies the key frame setting condition, record the frame as a current key frame.

The sending module 350 is further configured to send the graphical instruction data of the frame to the user equipment.

In some embodiments, the judging module 320 includes:

a calculation unit, configured to calculate a difference between the frame and the current key frame; and a judging unit, configured to determine, according to whether the difference is beyond a threshold range, whether the frame satisfies the key frame setting condition.

In some embodiments, the apparatus 300 further includes:

a compression module 340, configured to compress the differential data.

The sending module 350 is configured to send the compressed differential data to the user equipment.

In some embodiments, the apparatus 300 further includes:

a data processing module 370, configured to capture a drawing operation of a graphical interface of each frame, to generate graphical instruction data, and place the graphical instruction data into a processing queue.

The obtaining module 310 is specifically configured to obtain the graphical instruction data of the frame from the processing queue.

It may be understood that functions of functional modules of the apparatus in this embodiment of the present disclosure may be specifically implemented according to the method in the foregoing method embodiment. For a specific implementation process of the apparatus, refer to a related description in the foregoing method embodiment. Details are not described herein again. The apparatus in this embodiment of the present disclosure may be a server.

As can be learned from the above, in some feasible implementations of the present disclosure, differential data between graphical instruction data of a frame and graphical instruction data of a current key frame is obtained and is compressed, and the compressed data is used as to-be-sent data of the frame. Because a size of the differential data is far less than that of original graphical instruction data, a quantity of transmitted data can be effectively reduced, and a requirement on bandwidth can be lowered, thereby helping implement efficient and smooth communication between the server and the user equipment, and ensuring smoothness of interfaces of images.

Figure 10:
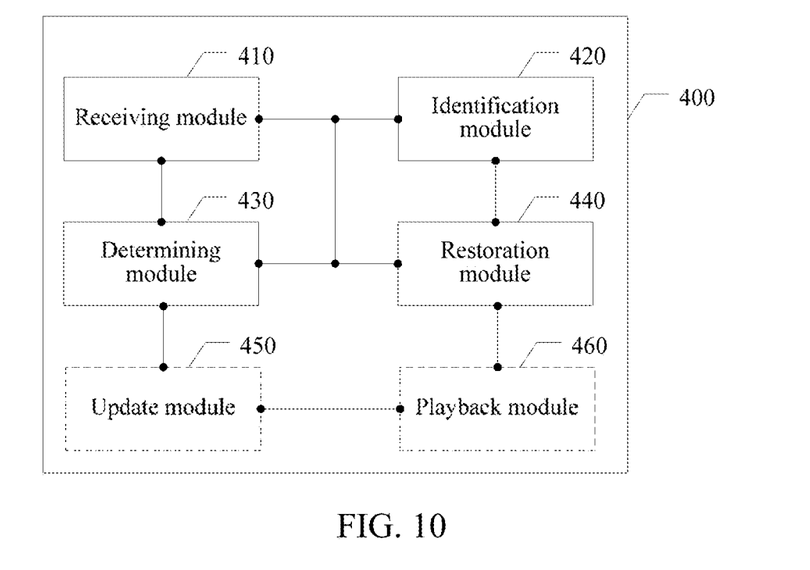
FIG. 10 is a schematic structural diagram of a graphical instruction data processing apparatus according to another embodiment of the present disclosure.

Referring to FIG. 10, an embodiment of the present disclosure further provides a graphical instruction data processing apparatus 400, applied to user equipment of a cloud interactive system. The cloud interactive system includes a server and the user equipment. The apparatus 400 may include:

a receiving module 410, configured to receive data of a frame that is sent by the server;

an identification module 420, configured to identify whether the frame is a key frame;

a determining module 430, configured to: if an identification result of the identification module is that the frame is not a key frame, obtain a current key frame, and determine that the data of the frame is differential data between the frame and the current key frame; and a restoration module 440, configured to obtain graphical instruction data of the frame according to the data of the frame and the current key frame.

In some embodiments, the apparatus 400 further includes:

an update module 450, configured to: if the identification module identifies that the frame is a key frame, determine that the data of the frame is the graphical instruction data of the frame; and record the frame as a current key frame.

In some embodiments, the apparatus 400 further includes:

a playback module 460, configured to play back the graphical instruction data of the frame, to generate a graphical interface of the frame.

In some embodiments, the data of the frame is compressed data, and the receiving module is further configured to decompress the compressed data.

It may be understood that functions of functional modules of the apparatus in this embodiment of the present disclosure may be specifically implemented according to the method in the foregoing method embodiment. For a specific implementation process of the apparatus, refer to a related description in the foregoing method embodiment. Details are not described herein again. The apparatus in this embodiment of the present disclosure may be user equipment.

As can be learned from the above, in some feasible implementations of the present disclosure, differential data between graphical instruction data of a frame and graphical instruction data of a current key frame is obtained, and the differential data is used as to-be-sent data of the frame. Because a size of the differential data is far less than that of original graphical instruction data, a quantity of transmitted data can be effectively reduced, and a requirement on bandwidth can be lowered, thereby helping implement efficient and smooth communication between the server and the user equipment, and ensuring smoothness of interfaces of images.

An embodiment of the present disclosure further provides a cloud interactive system. As shown in FIG. 3, the cloud interactive system includes a server and user equipment.

The server is configured to: obtain graphical instruction data of a frame; determine whether the frame satisfies a key frame setting condition; if the frame does not satisfy the key frame setting condition, compare the graphical instruction data of the frame with graphical instruction data of a current key frame, to obtain differential data; and send the differential data to the user equipment.

The user equipment is configured to: receive data of the frame that is sent by the server; identify whether the frame is a key frame; if the frame is not a key frame, obtain a current key frame, and determine that the data of the frame is differential data between the frame and the current key frame; and obtain graphical instruction data of the frame according to the differential data and the key frame.

In some embodiments, the server is further configured to: when determining that the frame satisfies the key frame setting condition, record the frame as a current key frame, and send the graphical instruction data of the frame to the user equipment; and the user equipment is further configured to: when identifying the frame as a current key frame, record the frame as the current key frame.

As can be learned from the above, in some feasible implementations of the present disclosure, data transmitted between a server and user equipment may be not all original graphical instruction data, and is replaced by differential data between a frame and a key frame. Therefore, a quantity of transmitted data can be effectively reduced, and a requirement on bandwidth can be lowered, thereby helping implement efficient and smooth communication between the server and the user equipment, and ensuring smoothness of interfaces of images.

An embodiment of the present disclosure further provides a computer readable storage medium storing one or more programs. When being executed by a server including one or more processors, the one or more programs cause the server to perform step 110 to step 130 in the graphical instruction data processing method in the foregoing method embodiment.

An embodiment of the present disclosure further provides another computer readable storage medium storing one or more programs. When being executed by user equipment including one or more processors, the one or more programs cause the server to perform step S210 to step S240 in the graphical instruction data processing method in the foregoing method embodiment.

Figure 11:
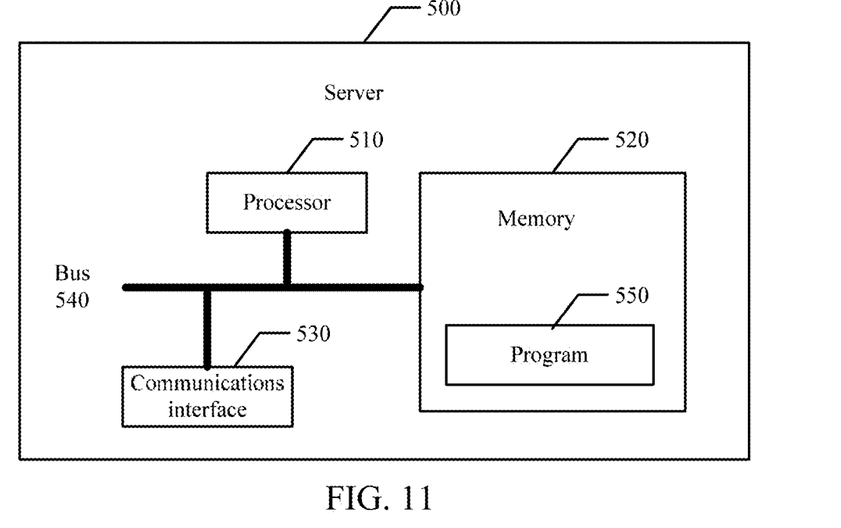
FIG. 11 is a schematic structural diagram of a server according to an embodiment of the present disclosure.

Referring to FIG. 11, an embodiment of the present disclosure further provides a server 500, which may include:

a processor 510, a memory 520, a communications interface 530, and a bus 540. The processor 510, the memory 520, and the communications interface 530 communicate with each other by using the bus 540. The communications interface 530 is configured to receive and send data. The memory 520 is configured to store a program 550. The processor 510 is configured to execute the program in the memory. When the server 500 runs, the processor 510 executes the program 550 stored in the memory 520, so that the server 500 performs step 110 to step 130 in the graphical instruction data processing method in the foregoing method embodiment.

Figure 12:
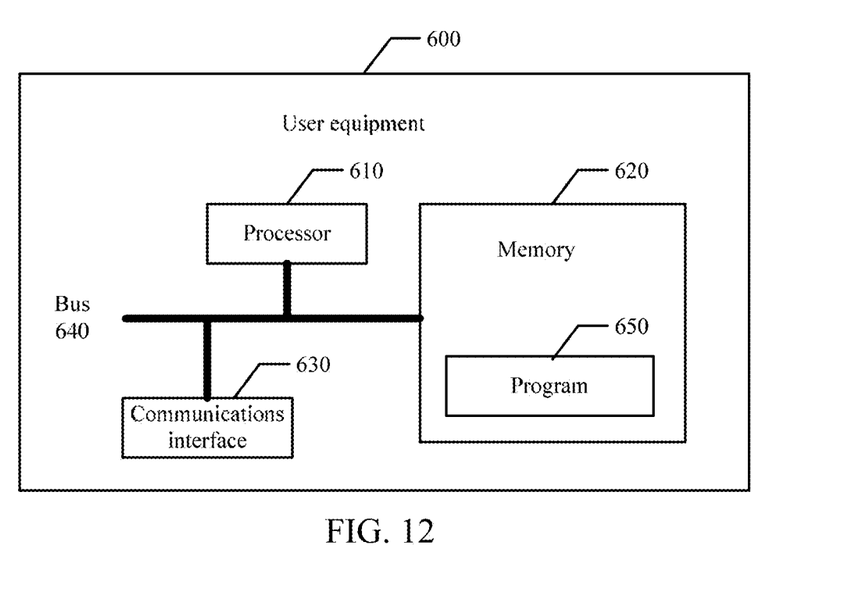
FIG. 12 is a schematic structural diagram of user equipment according to an embodiment of the present disclosure.

Referring to FIG. 12, an embodiment of the present disclosure further provides user equipment 600, which may include:

a processor 610, a memory 620, a communications interface 630, and a bus 640. The processor 610, the memory 620, and the communications interface 630 communicate with each other by using the bus 640. The communications interface 630 is configured to receive and send data. The memory 620 is configured to store a program 650. The processor 610 is configured to execute the program 650 in the memory. When the user equipment 600 runs, the processor 610 executes the program 650 stored in the memory 620, so that the user equipment 600 performs step S210 to step s240 in the graphical instruction data processing method in the foregoing method embodiment.

The processor 610 may be configured to: obtain graphical instruction data of a frame; determine whether the frame satisfies a key frame setting condition; and if the frame does not satisfy the key frame setting condition, compare the graphical instruction data of the frame with graphical instruction data of a current key frame, to obtain differential data.

The communications interface 630 may be configured to send the differential data to the user equipment, so that the user equipment obtains the graphical instruction data of the frame according to the current key frame and the differential data.

The bus may be an industry standard architecture (ISA) bus, a peripheral component interconnect (PCI) bus, an extended industry standard architecture (EISA) bus, or the like. The bus may be classified into one or more of an address bus, a data bus, or a control bus. For ease of representation, one bold line is used to represent the bus in the figure, but this does not mean that there is only one bus or only one type of bus.

The memory may include a high-speed random access memory (RAM). Optionally, the memory may further include a non-volatile memory. For example, the memory may include a magnetic disk memory.

The processor may be a central processing unit (CPU), or the processor may be an application-specific integrated circuit (ASIC), or the processor may be one or more integrated circuits configured to implement the embodiments of the present disclosure.

In the foregoing embodiments, the description of each embodiment has respective focuses. For a part that is not described in detail in an embodiment, refer to related descriptions in other embodiments.

It is noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that all the embodiments described in this specification are exemplary embodiments, and the related actions and modules are not necessarily required in the present disclosure.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

The graphical instruction data processing method and apparatus, and the system provided in the embodiments of the present disclosure are described in detail above. The principle and implementations of the present disclosure are described herein by using specific examples. The descriptions about the embodiments are merely provided for ease of understanding of the method and core ideas of the present disclosure. A person of ordinary skill in the art may make variations and modifications to the present disclosure in terms of the specific implementations and application scopes according to the ideas of the present disclosure. Therefore, content of this specification shall not be construed as a limit to the present disclosure.

What is claimed is:

1. A method for processing graphical instruction data, comprising:
   obtaining, by processing circuitry of a server device that interacts with user equipment in an interactive system, graphical instruction data of a frame for a real time cloud game that is running on the server device while the cloud game is being displayed at the user equipment;
   determining whether the frame satisfies a key frame setting condition;
   when the frame is determined to fail to satisfy the key frame setting condition, comparing the graphical instruction data of the frame with graphical instruction data of a current key frame, to obtain differential data; and
   performing a sending operation of sending the differential data to the user equipment, the user equipment reconstructing the graphical instruction data of the frame according to the current key frame and the differential data
   the method further including
   performing a main processing thread of:
       capturing a drawing operation of a graphical interface for the frame,
       generating the graphical instruction data based on the drawing operation,
       placing the graphical instruction data into a processing queue, and
       performing a data difference analysis and compression processing thread, separately from the main thread,
   the data difference analysis and compression processing thread including:
       extracting the graphical instruction data of the frame from the processing queue,
       performing analysis to generate the differential data and compressing the differential data based on the graphical instruction data, and
   the sending operation includes sending the compressed differential data to the user equipment separate from the main processing thread.

2. The method according to claim 1, wherein after the determining whether the frame satisfies the key frame setting condition, the method further comprises:
   when the frame is determined to satisfy the key frame setting condition, recording the frame as a new current key frame; and
   sending the graphical instruction data of the frame to the user equipment.

3. The method according to claim 1, wherein the determining whether the frame satisfies the key frame setting condition comprises:
   calculating a difference between the frame and the current key frame; and
   determining, according to whether the difference is out of a threshold range, whether the frame satisfies the key frame setting condition.

4. The method according to claim 1, wherein the comparing the graphical instruction data of the frame with the graphical instruction data of the current key frame to obtain the differential data further comprises:
   determining an optimal matching length and an offset location of the frame to the current key frame; and
   including the optimal matching length and the offset location in the differential data.

5. A method for graphical instruction data processing, comprising:
   receiving, by processing circuitry of user equipment that interacts with a server device in an interactive system, data of a frame, that is sent by the server device, for a real time cloud game that is running on the server device while the cloud game is being displayed at the user equipment;
   determining whether the frame is a key frame;
   when the frame is determined not to be a key frame, obtaining a current key frame;
   determining that the data of the frame is differential data between the frame and the current key frame; and
   obtaining graphical instruction data of the frame according to the data of the frame and the current key frame,
       wherein the server device performs a sending operation of sending the differential data to the user equipment, the user equipment reconstructing the graphical instruction data of the frame according to the current key frame and the differential data,
   the server device performing a main processing thread of:
       capturing a drawing operation of a graphical interface for the frame,
       generating the graphical instruction data based on the drawing operation,
       placing the graphical instruction data into a processing queue, and
       performing a data difference analysis and compression processing thread, separately from the main thread,
   the data difference analysis and compression processing thread including:
       extracting the graphical instruction data of the frame from the processing queue,
       performing analysis to generate the differential data and compressing the differential data based on the graphical instruction data, and
   the sending operation includes sending the compressed differential data to the user equipment separate from the main processing thread.

6. The method according to claim 5, wherein after identifying whether the frame is the key frame, the method further comprises:
   when the frame is determined to be the key frame, determining that the data of the frame is the graphical instruction data of the frame; and
   recording the frame as a current key frame.

7. The method according to claim 5, further comprising:
   processing the graphical instruction data of the frame, to generate a graphical interface of the frame.

8. The method according to claim 5, wherein the data of the frame is compressed data, and the method further comprises:
   after receiving the compressed data of the frame that is sent by the server device, decompressing the compressed data.

9. The method according to claim 5, further comprising:
   receiving an optimal matching length and an offset location in the differential data; and recovering the graphical instruction data of the frame according to the current key frame, the optical matching length and the offset location.

10. The method according to claim 5, wherein the identifying whether the frame is the key frame further comprises:
detecting whether the data of the frame includes a specific flag that is used to indicate the key frame.

11. An apparatus, comprising:
interface circuitry configured to receive data of a frame that is sent by a server device that interacts with the apparatus in an interactive system; and
processing circuitry configured to:
 determine whether the frame is a key frame;
 when the frame is determined not to be a key frame, obtain a current key frame;
 determine that the data of the frame is differential data between the frame and the current key frame; and
obtain graphical instruction data of the frame according to the data of the frame and the current key frame,
 wherein the server device performs a sending operation of sending the differential data to the apparatus, the apparatus reconstructing the graphical instruction data of the frame according to the current key frame and the differential data,
 the server device performs a main processing thread that is configured to:
  capture a drawing operation of a graphical interface for the frame,
  generate the graphical instruction data based on the drawing operation,
  place the graphical instruction data into a processing queue, and
  perform a data difference analysis and compression processing thread, separately from the main thread,
 the data difference analysis and compression processing thread is configured to:
  extract the graphical instruction data of the frame from the processing queue,
  perform analysis to generate the differential data and compressing the differential data based on the graphical instruction data, and
 the sending operation includes sending the compressed differential data to the apparatus separate from the main processing thread.

12. The apparatus according to claim 11, wherein the processing circuitry is configured to:
when the frame is determined to be the key frame, determine that the data of the frame is the graphical instruction data of the frame; and
record the frame as a current key frame.

13. The apparatus according to claim 11, wherein the processing circuitry is configured to:
process the graphical instruction data of the frame, to generate a graphical interface of the frame via a display screen.

14. The apparatus according to claim 11, wherein
the interface circuitry is configured to receive compressed data in the data of the frame; and
the processing circuitry is configured to decompress the compressed data.

15. The apparatus according to claim 11, wherein
the interface circuitry is configured to receive an optimal matching length and an offset location in the differential data; and
the processing circuitry is configured to recover the graphical instruction data of the frame according to the current key frame, the optical matching length and the offset location.

16. The apparatus according to claim 11, wherein the processing circuitry is configured to
detect whether the data of the frame includes a specific flag that is used to indicate the key frame.

* * * * *